J. M. GERMANSON.
REVOLUBLE OFFICE CHAIR.
APPLICATION FILED MAY 8, 1912.
1,107,780.
Patented Aug. 18, 1914.
2 SHEETS—SHEET 1.
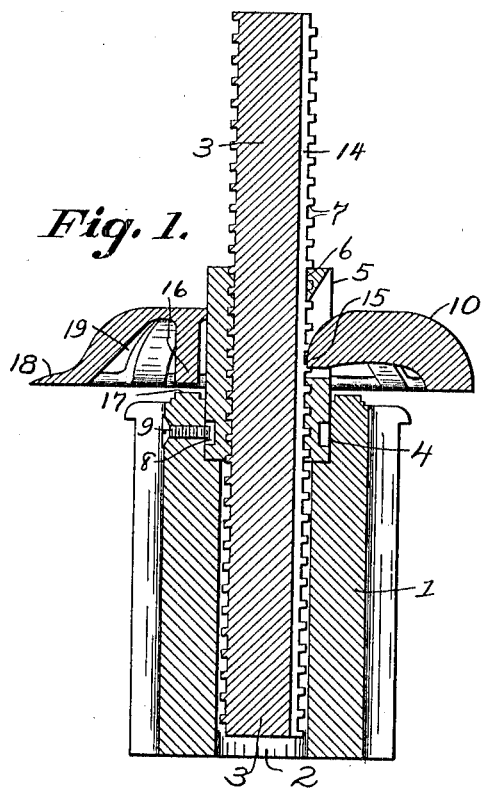
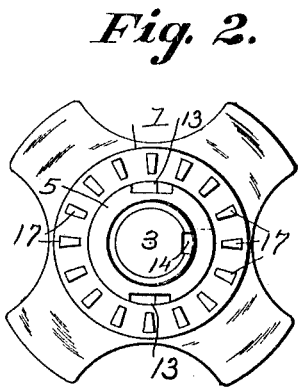
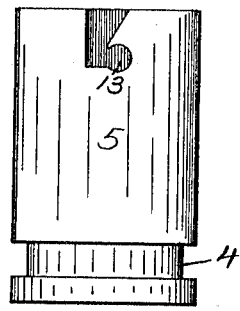
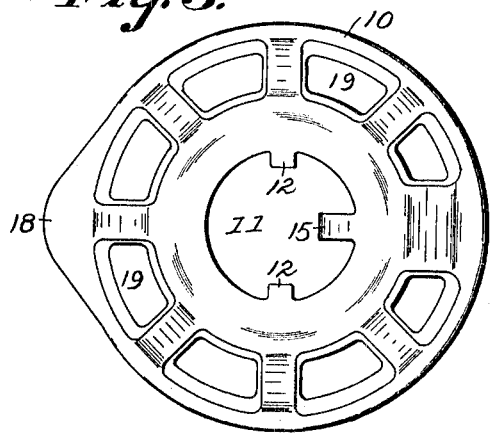
Witnesses
Inventor
Julius M. Germanson
By Ensign & Wheeler
Attorneys

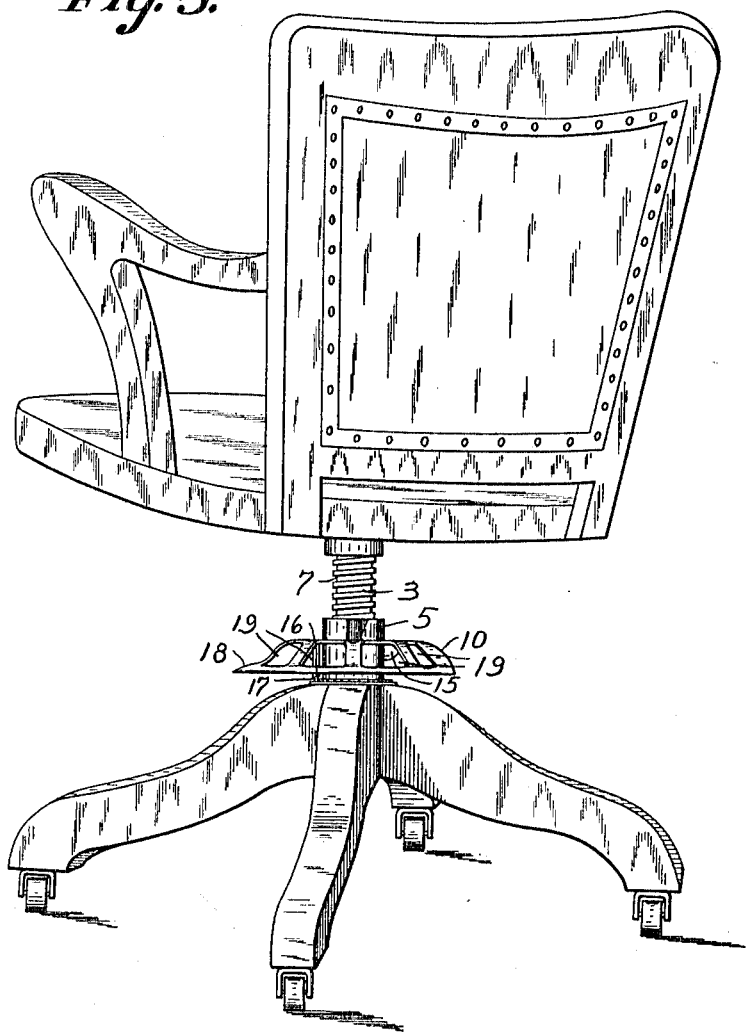

UNITED STATES PATENT OFFICE.

JULIUS M. GERMANSON, OF MILWAUKEE, WISCONSIN.

REVOLUBLE OFFICE-CHAIR.

1,107,780.  Specification of Letters Patent.  Patented Aug. 18, 1914.

Application filed May 8, 1912. Serial No. 695,835.

*To all whom it may concern:*

Be it known that I, JULIUS M. GERMANSON, a citizen of the United States, residing at Milwaukee, county of Milwaukee, and State of Wisconsin, have invented new and useful Improvements in Revoluble Office-Chairs, of which the following is a specification.

My invention relates to improvements in that class of office chairs in which the seat is adapted to be revolubly and adjustably supported by a screw, which screw is adjustably supported from a revoluble nut carried by a stationary hub.

The object of my improvement is, among other things,—first, to provide a device for automatically and temporarily locking the revoluble nut and screw of the chair together, so that they will normally turn together with the seat, whereby the liability of the screw accidentally turning down in the nut as it might otherwise do, is avoided. Second, to provide a device for simultaneously locking the nut in engagement with the hub as the screw is being turned upwardly and downwardly in the nut, whereby the nut will be prevented from revolving with the screw as the screw and seat are adjusted either higher or lower, and third, to provide a device for pivotally supporting an ornamental collar from the nut above the hub, such collar being provided on two opposing sides with locking lugs, whereby as one side of said collar is tilted downwardly, one of said locking lugs will be withdrawn from locking engagement with said screw while the opposite lug will be simultaneously brought into engagement with projections formed on said hub, whereby said nut and ornamental collar will be prevented from turning with said screw.

My invention is further explained by reference to the accompanying drawings, in which—

Figure 1 represents a vertical section of the screw, screw supporting nut, hub and stationary collar removed from the seat and legs of the chair. Fig. 2 represents a top view of the hub and screw with the ornamental collar and legs removed therefrom. Fig. 3 is a top view of the ornamental collar removed from the other coöperating parts. Fig. 4 is a side view of the nut in which the screw is adapted to be supported, and Fig. 5 repreesents a perspective view of the chair as a whole, comprising the seat, screw, nut, ornamental collar and the supporting legs.

Like parts are identified by the same reference numerals throughout the several views.

1 is a hub which is provided with a vertical central bore 2 for the reception of the screw 3 and with an annular socket or recess 4 for the reception of the lower end of the nut 5. The nut 5 is provided with an internal screw thread 6 for engagement with the threads 7 of said screw. The nut 5 is also provided with an annular channel 8 for the reception of the retaining screw 9, which screw 9 has threaded bearings in the hub 1 and is adapted to engage at its inner end in the annular channel 8 of the nut, whereby the nut is prevented from being accidentally withdrawn from the hub while it is free to turn therein with the revoluble movement of the screw 3. The upper end of the screw 3 is adapted to be rigidly connected with the seat of the chair in the ordinary manner.

10 is an ornamental collar which is provided with a central aperture 11 for the reception of the upper end of the nut 5 and two opposing lugs 12, 12, adapted to engage in the angular recesses 13 formed on two opposing sides of the nut 5.

The screw 3 is provided throughout its length with a vertical channel 14 for the reception of a locking lug 15 formed on the lower side of said ornamental collar 10, said lug being adapted, when said collar is pivotally supported from said lugs 12, to engage in said vertical channel 14, as shown in Fig. 1, whereby said collar, screw and nut are normally interlocked together so long as said ornamental collar is permitted to remain in its normal horizontal position. Said collar 10 is also provided with a vertical lug 16 located on the opposite side from said lug 15, while the upper surface of the hub 1 is provided with an annular series of vertical teeth or projections 17, whereby as a downward pressure is applied to the projecting lip 18 of said collar, said lug 15 will be brought out of engagement with the vertical channel 14 of said screw, while said vertical lug 16 will be simultaneously brought into engagement with the vertical projections 17, whereby said nut and hub will be locked together and said nut will be prevented from turning with the screw as the seat is being adjusted higher and lower.

It is obvious that the same tilting movement of the collar 10 which releases the screw 3 from locking engagement with the nut 5, will simultaneously engage said nut with said hub, whereby the screw will be free to be turned in said nut, while the nut will be prevented from turning in said hub. The lip 18 is formed upon one side of the collar 10 for the purpose of quickly determining upon which side of such collar the downward pressure should be applied when adjusting the seat of the chair. The collar 10 is also preferably provided around its periphery with a plurality of openings 19, which not only serve to reduce the weight of such collar, but also give to the same an ornamental finish.

Having thus described my invention, what I claim as new, and desire to secure by Letters Patent, is—

1. In a device of the described class, the combination with a chair hub, a seat supporting screw, provided with a vertical channel, a nut having threaded bearings on said screw, a collar pivotally supported from two opposite sides of said nut, a lug formed on one side of said collar, adapted to engage in said vertical channel, whereby said screw, nut and collar are normally locked together, and means caused by the tilting of said collar for locking said nut to said hub, and simultaneously releasing the locking mechanism between said screw and nut, whereby said screw may be revolved without revolving said nut and the seat adjusted to a higher or lower plane.

2. In a device of the described class, the combination of a chair hub provided with a smooth vertical bore for the reception of a seat supporting screw, a seat supporting screw provided with a vertical channel, a seat supported upon the upper end of said screw, a nut having screw threaded bearings on said screw revolubly supported from said nut, a tilting collar provided with a central aperture inclosing said nut and screw, a pair of lugs by which said collar is pivotally supported from the sides of said nut, a lug on the collar adapted to engage said vertical channel and normally lock said collar, nut and screw together, said collar being provided with an additional lug adapted, as said collar is tilted, to engage a vertical projection formed on said hub as the opposite lug of said collar is withdrawn from the vertical channel of said screw, whereby said collar and nut are prevented from turning with said screw, and said screw is adapted to be turned upwardly or downwardly in said hub, and the seat of the chair adjusted at different elevations.

In testimony whereof I affix my signature in the presence of two witnesses.

JULIUS M. GERMANSON.

Witnesses:
 JAS. B. ERWIN,
 I. D. BREMER.